United States Patent [19]

Fuehrer et al.

[11] Patent Number: 4,768,401
[45] Date of Patent: Sep. 6, 1988

[54] VEHICLE RETARDER SYSTEM AND CONTROL

[75] Inventors: Reece R. Fuehrer, Danville; Harvey D. Won, Carmel, both of Ind.

[73] Assignee: General Motors Corporation, Detroit, Mich.

[21] Appl. No.: 65,350

[22] Filed: Jun. 23, 1987

[51] Int. Cl.$^4$ .................... B60K 41/16; B60K 41/18
[52] U.S. Cl. ................................ 74/846; 74/866; 192/4 B
[58] Field of Search ............... 74/866, 846; 192/9, 192/4 B

[56] References Cited

U.S. PATENT DOCUMENTS

| | | | |
|---|---|---|---|
| 4,070,927 | 1/1978 | Polak | 74/765 |
| 4,373,619 | 2/1983 | Schritt et al. | 74/866 X |
| 4,480,728 | 11/1984 | Bailey et al. | 192/4 B X |
| 4,497,219 | 2/1985 | Elsner | 192/4 B X |
| 4,630,507 | 12/1986 | Kugler et al. | 74/733 |
| 4,699,022 | 10/1987 | Stadt et al. | 74/846 X |

Primary Examiner—Dirk Wright
Attorney, Agent, or Firm—Donald F. Scherer

[57] ABSTRACT

A vehicle retarder system has a hydraulic retarder and a slipping friction brake operating in concert to retard the forward motion of the vehicle. The hydraulic retarder is an output driven device which is operable to absorb increasing energy as the vehicle speed increases. The friction brake is normally a ratio control reaction brake for the lowest forward drive ratio of the vehicle transmission. The brake has an additional apply piston which is operable to slippingly engage the brake whenever the hydraulic retarder is operable and the vehicle transmission is not in the lowest forward ratio. The control system has a control valve which is operable to control the engagement pressure of the additional piston in a manner such that the friction braking effort is higher at low vehicle speeds. This compensates for the lower effectiveness of the output driven hydraulic retarder. The control system is also effective to control the operation of the hydraulic retarder, the main piston of the reaction brake, cooling flow to the brake and cooling flow from the retarder.

1 Claim, 2 Drawing Sheets

VEHICLE RETARDER SYSTEM AND CONTROL

BACKGROUND OF THE INVENTION

This invention relates to vehicle retarder systems and more particularly said systems having both hydraulic and friction brake retardation.

Vehicle retardation systems which employ the vehicle service brakes and the hydraulic retarder in concert have been utilized in the past. These operating systems generally use the service brake only when the rapid retardation is required to bring the vehicle to a stop. During normal retardation, only the hydraulic retarder is in use since continued slipping of the vehicle service brakes causes significant heat generation and brake wear. It has also been proposed to control the transmission drive ratio during retardation. In these systems, the transmission is shifted to a lower drive ratio so the torque converter is driven at a high speed to maximize the engine braking; and an input driven retarder is also driven at a very high speed to improve the braking efficiency of the retarder.

SUMMARY OF THE INVENTION

The present invention provides a vehicle retarder system which permits the use of a small diameter output driven hydraulic retarder while maintaining satisfactory retardation at low vehicle speeds. This is accomplished without adding to the outer diameter of the hydraulic retarder. The transmission reaction brake, of the lowest drive ratio, is used as a slipping friction brake. This permits improved retardation at low vehicle speeds when the vehicle transmission is in the second or higher gear ratio. As will be recognized by those familiar with the art, partial application of the low ratio brake tends to establish a lockup condition in the transmission. Since the brake is only slippingly applied, a transmission lockup condition does not occur while vehicle braking does. Normally vehicle retardation is not of great import when the vehicle is operating in the lowest drive ratio or in reverse. That is why the low ratio rate has been selected as the vehicle retardation brake with this system.

When the friction braking is used for low speed retardation, the output driven hydraulic retarder can be maintained in a smaller package. This is possible because, at the lower vehicle speeds, the friction retardation will be generally sufficient for slowing the vehicle when hydraulic retardation or hydraulic braking is not as important. With this arrangement, the apply pressure for the reaction brake is controlled so that complete brake apply cannot occur, and the apply pressure is reduced at higher vehicle speeds. Also, a portion of the retarder supply or feed oil is used to provide cooling and lubrication for the slipping brake. This oil is supplied only during retardation and not during the normal function of the reaction brake. At higher vehicle speeds, the hydraulic retarder has increased capacity, as is well known, and therefore the friction braking capacity can be reduced.

It is, therefore, the object of this invention to provide an improved vehicle retardation system wherein a reaction brake for the lowest of the forward drive ratios is slippingly applied in concert with an output driven hydraulic retarder.

It is another object of this invention to provide an improved vehicle retardation system in a vehicle having a multispeed power transmission with at least the lowest forward drive ratio being established by reaction brake, wherein the reaction brake has two apply pistons with only one of said pistons being pressurized during vehicle retardation so that at low vehicle speeds a slipping friction retarder acts in concert with a hydraulic retarder and further wherein the apply pressure of the one piston is reduced as vehicle speed is increased.

These and other objects and advantages of the present invention will be more apparent from the following description and drawings.

DESCRIPTION OF AN EXEMPLARY EMBODIMENT

Figure 1:
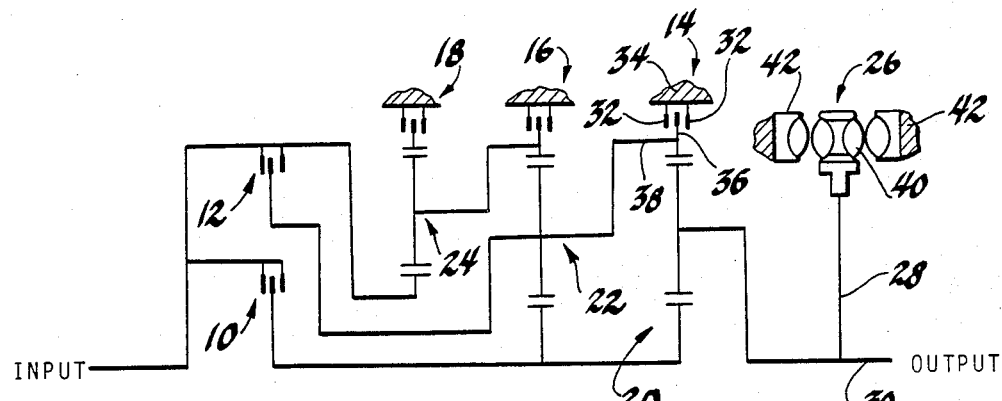
FIG. 1 is a schematic representation of a transmission retarder system.

The gearing arrangement shown in FIG. 1 is substantially identical with that described in U.S. Pat. No. 4,070,927 issued to Polak Jan. 31, 1978. This planetary transmission provides six forward speeds and one reverse speed through the use of two friction clutches 10 and 12 and three friction brakes 14, 16 and 18 which are operable to control three planetary gear sets 20, 22 and 24. The clutch 10 is engaged in the first or lowest speed ratio and also in the second, third and fourth speed ratios. The clutch 12 is engaged in the fourth, fifth and sixth speed ratios. Brake 14 is engaged in the first and reverse speed ratios. Brake 16 is engaged in the second and sixth speed ratios and brake 18 is engaged in the third, fifth and reverse speed ratios. A hydraulic retarder generally designated 26 is drivingly connected through a hub 28 to an output shaft 30 of the power transmission. A brake 14 has a plurality of friction discs 32 which are connected to a stationary component in the transmission designated 34 and a plurality of plates 36 which are drivingly connected to a power transmission member 38. For those wishing a more complete description of the operation of this planetary gear set, their attention is directed to the aforementioned Polak patent wherein a complete description of the operation and the interchange of friction devices is discussed. For the purposes of this disclosure, it will be satisfactory to recognize that when the transmission is operating in the second, third, fourth, fifth or sixth forward drive ratio, full engagement of the brake 14 will cause a significant lockup within the planetary gear arrangement. Thus, it should be understood that controlling the brake 14 in slipping engagement, when one of the other forward drive ratios is fully engaged, will cause a retardation in the rotation of the output shaft 30 resulting in retardation of vehicle speed.

The hydraulic retarder 26 includes a rotary member 40 connected with the hub 28 which is operable to circulate fluid between vane members found on member 40 and vane members found on a stationary housing 42. Fluid circulation between the vanes on these components 40 and 42 results in power absorption and retardation of the speed of the output shaft 30 which therefore results in retardation of vehicle speed. It should be appreciated that hydraulic retarders, such as 26, will increase in efficiency as the rotary speed of member 40 increases. The operation of hydraulic retarders is a well known phenomenon, so that a more thorough dissertation of the operation thereof is not needed here.

Figure 3:
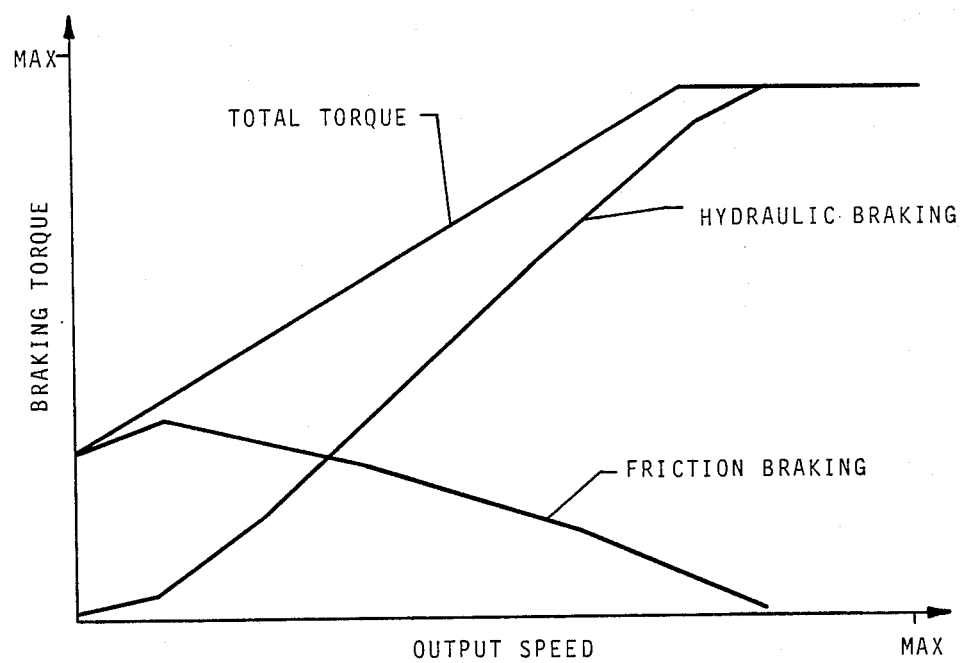
FIG. 3 is a plot of output speed versus torque showing the various braking components and their summation.

The curves shown in FIG. 3 represent friction braking, hydraulic braking and total braking torque. The friction braking is a result of the slipping engagement of brake 14 when a forward ratio other than first has been selected. The hydraulic braking is the result of the hydraulic retarder 26 churning fluid between the members 40 and 42. The total torque is the summation of friction braking and hydraulic braking. By viewing the curves, it will be recognized that hydraulic braking increases rapidly with output speed. The friction braking is shown to decrease with output speed. This decrease in friction braking is provided by controlling the apply pressure which is present at the brake 14.

Figure 2:
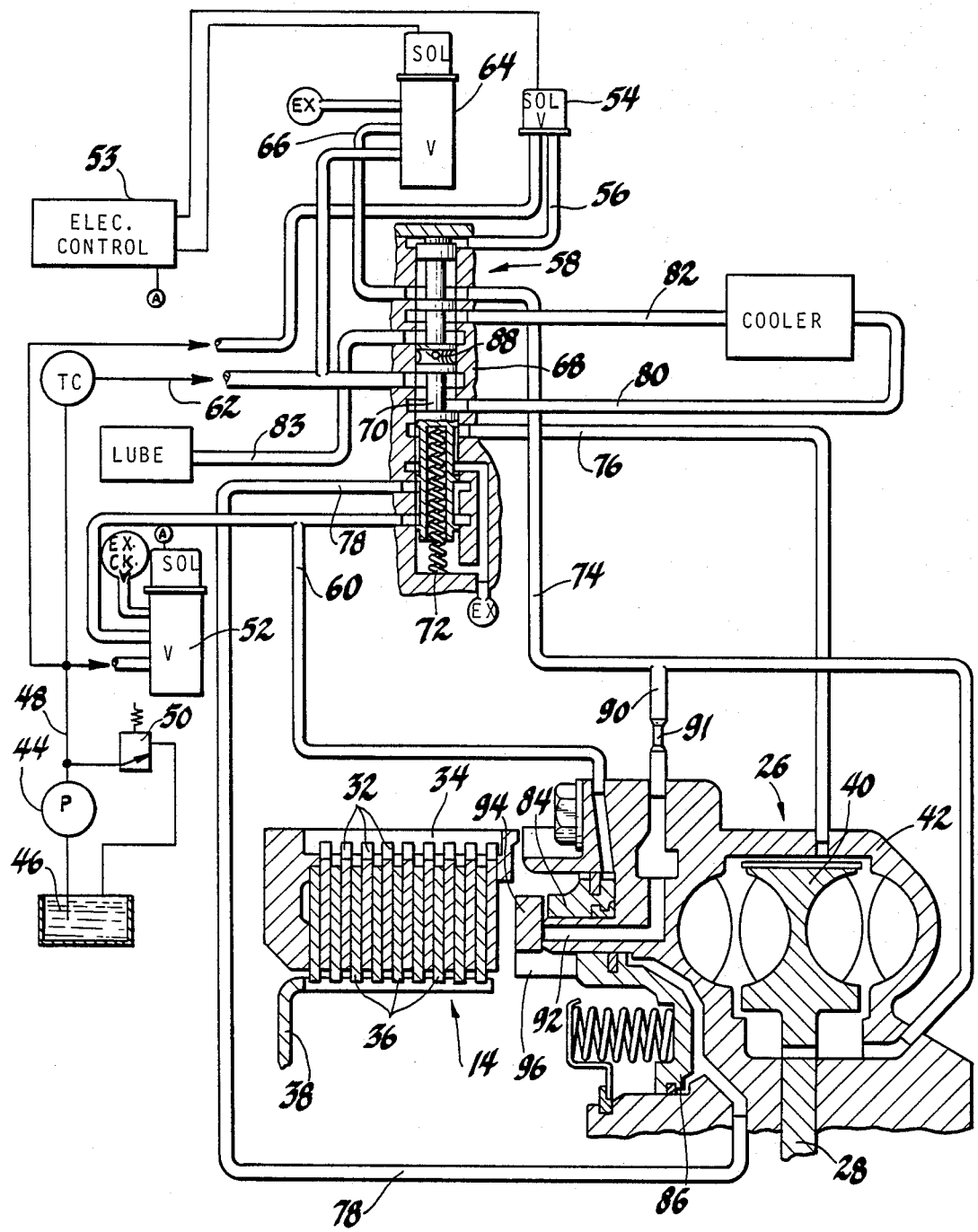
FIG. 2 a diagrammatic representation of a portion of a retarder and friction brake and a control system for controlling these devices.

Referring to FIG. 2, there is seen a representation of the brake 14, the retarder 26 and a hydraulic control circuit. The control circuit provides pressurized fluid for the operation of the brake and retarder.

The control system includes a conventional hydraulic pump 44 which is operable to draw fluid from a reservoir 46 and deliver fluid to a main pressure passage 48. Fluid pressure in the passage 48 is controlled by a conventional pressure regulator valve 50. The pump supplies fluid pressure to a torque converter which is operatively connected to the input shaft of the planetary transmission shown in FIG. 1. The pump also supplies fluid to a conventional control system, not shown, for the transmission which is operable to control the interchange of drive ratios when the vehicle is operating. The torque converter and control system can be selected from many of the well known devices which are available to provide these services. The control system is preferably a computer controlled system 53 wherein external signals or parameters such as engine speed, vehicle speed, throttle position, engine temperature and transmission temperature are recorded and utilized as signals to control the operating condition of the transmission. Also, a brake signal is present which is operable to determine when the vehicle retardation through the use of the hydraulic retarder is requested.

The pump 44 also supplies fluid pressure to a brake pressure control valve 52 and to a retarder control valve 54. The retarder control valve 54 is a conventional on/off type solenoid which when open delivers fluid through a passage 56 to a retarder control valve designated 58. The brake control valve 52 supplies fluid pressure to a retardation brake apply passage 60 which is in fluid communication with the brake 14 and to a port on the retarder control valve 58.

The brake pressure control valve 52 is a pulse width modulated solenoid control valve. This means that the duty cycle of a solenoid is controlled such that the output pressure, that is the pressure in passage 60, is controlled as a function of the duty cycle of the solenoid. This permits very accurate pressure control at the output of the solenoid or brake pressure control valve 52.

The torque converter output flow in passage 62 is communicated with the retarder control valve 58 and also with a retarder pressure control valve 64. The retarder pressure control valve 64 is also a pulse width modulated solenoid type valve such that the output pressure in passage 66 can be controlled as a function of the duty cycle of the solenoid. Pulse width modulated solenoid valves are well known and have been proposed for use in a number of transmission control applications.

The output passage 66 of the retarder pressure control valve 64 is in fluid communication with the retarder control valve 58.

The retarder control valve 58 has a valve body 68 in which is slidably disposed a multi-landed valve spool 70 which is urged upwardly as seen in FIG. 2 by a compression spring 72. In addition to the already enumerated passage connections, the valve body 68 is also in fluid communication with a hydraulic retarder feed passage 74, a hydraulic retarder return passage 76, a brake apply passage 78, a pair of cooler passages 80 and 82, and a lube passage 83.

In the spring set position shown, the valve spool 70 provides communication between passage 60 and 78. A passage 60 is in fluid communication with a secondary piston 84 while the passage 78 is in fluid communication with a primary piston 86. The primary piston 86 has a larger area than the secondary piston 84. During the normal transmission operation, the valve 52 will be energized whenever the low ratio brake 14 is applied. With the control system as shown, the apply pressure in passage 60 will be communicated to the secondary piston 84 and also via valve 58 and passage 78 to the primary apply piston 86. Thus, the brake 14 will receive full engagement pressure, and will be fully engaged to prevent rotation of the hub 38.

Also in the spring set position of retarder control valve 58, the torque converter output in passage 62 is directed via valve spool 70 to passage 80 from which it passes through the cooler and returns to the lube via valve 58 and passage 83. From the lube circuit, the fluid returns to the reservoir 46. When vehicle retardation is requested, the solenoid valve 54 will be energized such that passage 56 will be pressurized. This will cause the valve spool 70 to move against the spring 72 or downward as it is seen in FIG. 2. With this movement, the brake apply passage 78 is connected to exhaust. The return passage 76 for the retarder 26 is connected to the cooler passage 80, and the cooler return passage 82 is connected to the retarder feed passage 74. The pressure in the retarder feed passage is controlled by the retarder pressure control valve 64. As previously mentioned, this is a pulse width modulated valve and therefore the retarder feed pressure can be varied. The valve spool 70 has a cross drilled passage 88 which permits a portion of the return flow from the torque converter to be distributed to the lube circuit such that transmission lubrication will continue during retardation, however the majority of the fluid from the torque connector is directed through valve 64 and passage 66 to the retarder feed passage 74.

Since the output pressure or the return pressure from the hydraulic retarder is generally greater than the inlet or feed pressure, the recycling of fluid through the cooler to the retarder input is permitted. The passage 60 as previously mentioned is connected with the brake pressure control valve 52. Thus, the pressure within the passage 60 is controlled by the computer control 53. Thus, the pressure can be controlled as a function of vehicle speed if desired. By providing the pressure as a function of vehicle speed, the engagement or apply pressure in secondary piston 84 can be varied as a function of vehicle speed. Thus the apply force of the brake 14 is very easily controlled such that at low vehicle speeds a higher brake force is available. This brake force is controlled such that the brake 14 becomes a continually slipping member and does not provide stoppage of the hub 38. Since the brake 14 is a continually slipping member during retardation, there is need for cooling and lubrication flow. This is accomplished through a passage 90 and a restriction 91 which is fed by the hydraulic retarder feed passage 74. This passage 90 is only pressurized when the passage 74 is pressurized and therefore only makes fluid available to the brake 14 for cooling or lubrication when the retarder operation is requested. The passage 90 is in fluid communication with one or more nozzle or exhaust passages 92 formed in the housing for the brake 14. These passages 92 are normally covered by a plate 94 which is an extension of the piston 76. As the piston 84 is moved leftward as viewed in FIG. 2, the plate 94 is moved leftward with the piston 74 to cause the partial or slipping engagement of the discs 32 and 36 of brake 14. As the plate 94 is moved leftward, the passage 92 becomes open through slots 96 such that fluid available thereto can be distributed at the inner surface of the discs 32 along the hub 38. The fluid distributed at this point will migrate between the adjacent discs 32 and 36 such that cooling of the disc plates is provided during retardation. It is important to maintain the brake plates cooled since the slippage therebetween gives rise to a large amount of heat generation.

As previously mentioned in FIG. 3, the friction braking torque decreases as output speed increases from a minimum value to a maximum value. This friction braking decrease is brought about through the control of the brake apply pressure in passage 60. Also as set out above, this pressure is controlled by a pulse width modulated valve 52 which in turn is controlled by the computer control system 53. Thus, the shape of the friction braking curve can be accurately controlled so that it can be efficiently and rapidly reduced when significant hydraulic braking from the retarder 26 is available. This pressure can also be controlled in such a manner such that the total output torque curve is given the desired shape.

The embodiments of the invention in which an exclusive property or privilege is claimed are defined as follows:

1. A vehicle retardation system for a vehicle having a hydraulically operated multi-ratio power transmission comprising a power output, and a selectively engageable friction brake means for establishing a low forward drive ratio in the transmission and being operable to retard the vehicle if engaged when another forward ratio has been established; said retardation system comprising: hydraulic retarder means operatively connected with the power output of the transmission for retarding vehicle movement when fluid is admitted thereto; a pair of fluid pressure operated piston means for selectively engaging said brake means; control valve means for determining the pressure of the fluid directed to both said piston means; retarder control valve means for directing pressurized fluid to said retarder means, for directing fluid from said retarder means, for disconnecting one of said piston means from said control means and for connecting said one piston means to exhaust; and means for distributing fluid to said brake means for cooling thereof only when said other of said piston means is pressurized, said other piston means being pressurized to slippingly engage said brake means when vehicle retardation is desired and when the power transmission is operating in a ratio other than the low forward ratio.

* * * * *